United States Patent [19]

Dolan et al.

[11] Patent Number: 5,190,115
[45] Date of Patent: Mar. 2, 1993

[54] MODULAR MAILING MACHINE WITH LOAD CELL SCALE

[75] Inventors: Donald T. Dolan, Ridgefield; Robert T. Durst, Jr., Fairfield; Seymour Feinland, Stamford; Gerald C. Freeman, Norwalk; Morton Silverberg, Westport, all of Conn.

[73] Assignee: Pitney Bowes Inc., Stamford, Conn.

[21] Appl. No.: 768,143

[22] Filed: Sep. 27, 1991

Related U.S. Application Data

[63] Continuation-in-part of Ser. No. 575,021, Aug. 30, 1990, Pat. No. 5,082,072.

[51] Int. Cl.$^5$ ............................ G01G 19/40; G01G 23/10
[52] U.S. Cl. .................................... 177/25.15; 177/185
[58] Field of Search ....................... 177/25.15, 145, 185

[56] References Cited

U.S. PATENT DOCUMENTS 4,778,018 10/1988 Cordery et al. ............... 177/185 X
4,849,918 7/1989 Feinland ..................... 177/25.15 X
4,951,763 8/1990 Zimmerman et al. ........... 177/185 X Primary Examiner—George H. Miller, Jr.
Attorney, Agent, or Firm—Robert H. Whisker; Melvin J. Scolnick

[57] ABSTRACT

A mailing machine comprised of a plurality of modules, each of the modules a particular process function on a delivered envelope. The modules are arranged with in a single process station. The comprising modules include a load cell type scale module having means for weighing a envelope, a transport module having means for positioning the envelope in the process station and ejecting the envelope from the process station, a meter module having printing means for imprinting an indicia on the envelope, a platen module having means for causing the envelope to contact the printing means of the meter module, and a inking module having means for causing printing ink to be deposited on the printing means of the meter module. The modules operate in a manner functionally independent of any other module and in a manner. A tape module is included having means for positioning a tape for indicia printing between the meter module. A cutter module is further included having means for cutting the tape porting subsequent to indicia printing thereon.

20 Claims, 14 Drawing Sheets

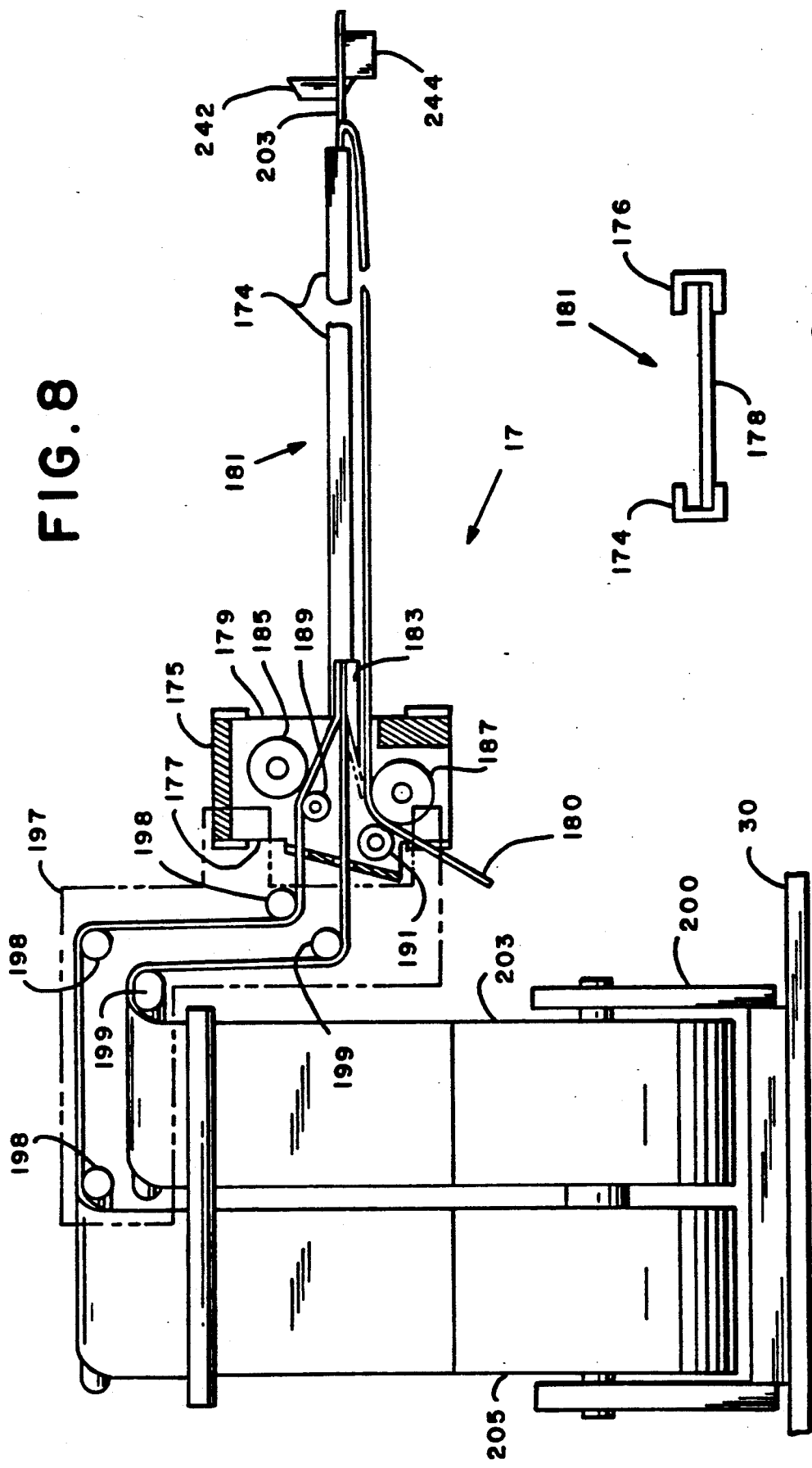
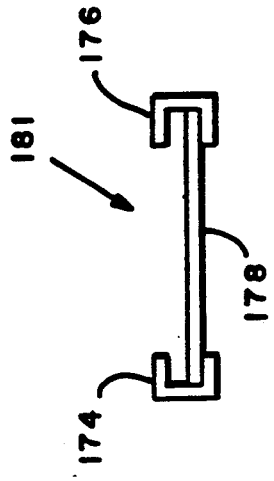
FIG. 8
FIG. 8A

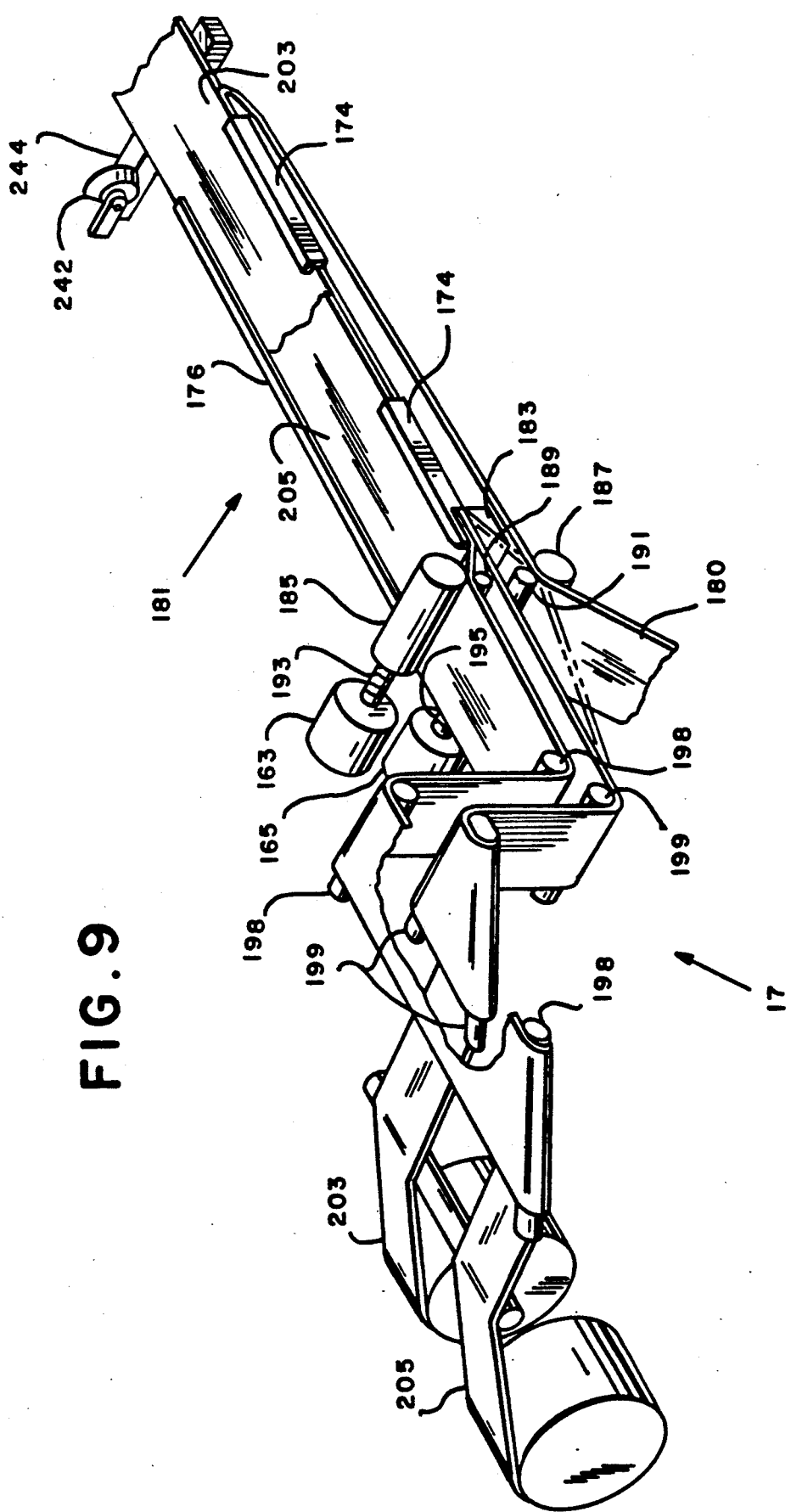

MODULAR MAILING MACHINE WITH LOAD CELL SCALE

RELATED APPLICATIONS

This application is a continuation-in-part of U.S. patent application Ser. No. 575,021; filed: Aug. 30, 1990, now U.S. Pat. No. 5,082,072 and is directed to the modular mailing of that patent wherein the scale module is a novel load cell type scale, and shares common elements of disclosure with commonly assigned, co-pending U.S. applications Ser. Nos. 07/767,301 and 07/768,793, filed on even date herewith.

BACKGROUND OF THE INVENTION

This invention relates to imprinting systems, such as, postage meter mailing machine, which systems are used to imprint information on a sheet-like medium and, more particularly, to an imprinting system where the information imprinted on the sheet-like medium is correlative to a variable parameter of the medium, such as, imprinting a postage value indicia on a envelope wherein the postage value is correlative to the weight of the envelope.

In the mail processing field, it is most desirable for a system operator to be able to deliver to mail processing equipment a batch of "mixed mail", that is a batch comprised of a large number of envelopes of varying dimensions, particularly thickness and weight. The ability of a mail processing system to process a large variety of mixed mail eliminates the need for the system operator to perform the preliminary steps of presorting the mail. It is further desirable for mail processing equipment to be able to weigh the individual envelopes and affix the appropriate postage value indicia in accordance with the envelope weight. It is generally considered advantageous if the mail processing equipment can imprint a quality indicia upon envelopes varying in thickness from that of a postcard to approximately one quarter ($\frac{1}{4}$) of an inch.

It is known to provide mail processing equipment comprised of a feeder for singularly delivering envelopes in series to a transport assembly. The transport assembly deposits each envelope on the scale for weighing. After a sufficient time to assure a true scale reading of the envelope weight, commonly referred to as "weigh on the pause", the transport assembly again assumes control over the envelope and delivers the envelope to the mailing machine.

The mailing machine is most commonly comprised of an integral transport assembly and attached rotatory print drum type postage meter. The mailing machine transport assembly assumes speed control over the envelope performing any necessary speed adjustments to the envelope required to match the envelopes traversing speed with the imprinting speed of the postage meter print drum to promote a quality indicia print. It is known for the postage meter to include a value setting mechanism operating under the influence of the scale, which causes the postage meter value setting mechanism to adjust the postage meter printing mechanism for printing of the appropriate postage rate on the approaching envelope according to the envelope weight as determined by the scale.

The mail processing system depicted above has as its primary objectives (i) the capability to process a wide variety of envelopes (particularly with respect to thickness and weight) (ii) as fast as possible (in terms of envelopes per second) (iii) while applying a quality postal indicia.

The described mail processing system has several limiting factors with respect to increasing throughput relative to system cost. One such limiting factor is represented by the time required in transporting the envelopes from one process station to another. Another limiting factor is reflected in the time necessary to obtain an accurate weight from the scale. While such factors as transport time and weighing time can conceivably be decreased by incorporating advanced system techniques, the rule of diminishing returns predicts that small improvements in system throughput by such an incorporation would be achievable only with disproportionate increases in system cost.

One possible alternative means of increasing the throughput of such mail processing systems is to provide multiple scales and a suitable transport system such that the scales are placed in alternative use. Such an arrangement would conceivably allow overlapping of system process or function to achieve a significant increase system through. However, such an alternative represents added cost from both an equipment and system complexity standpoint.

SUMMARY OF THE INVENTION

Thus i t is an object of the present invention to provide a postage meter mailing machine having an increased throughput capability. The mailing machine includes a transport assembly for properly positioning an envelope in a process station. The envelope is fed to the mailing machine transport assembly by a suitable envelope feed apparatus such as a mixed mail feeder. After the envelope has been weighed and imprinted at the process station, the transport assembly assumes control over the envelope again and ejects or discharges the envelope from the mailing machine.

Pursuant to a further objective of the present invention, the mailing machine process station is comprised of an integral scale suitably adapted to accommodate the transport assembly, a vertically displaceable flat printing platen and a postage meter support assembly for supporting a suitably attached postage meter. By employing a multiple function processing station the mailing machine throughput is substantially increased by facilitating minimum time lag between functional operations on each envelope and eliminating the transportation time required by multiple process station systems.

Generally, the scale is isolation mounted to the mailing machine base and includes a plurality of slots in the weighing plate of the scale. The weighing plate has mounted thereto a plurality to support members having a generally C-configuration. The support members have fixably mounted thereto a envelope clamping assembly which functions to clamp an envelope to the weighing plate during weighing and to promote transport of the envelope.

In one embodiment of the mailing machine, described in the above referenced U.S. Pat. No. 5,082,072, the scale is a resilient type scale. In the present invention the scale is a novel load cell type scale designed for fast determination of weights.

U.S. Pat. No.: 4,787,048; issued: Nov. 22, 1988; to the inventors of the subject invention, discloses one approach to decreasing the time required for a postal scale to determine the weight of a mail piece. The system disclosed in this patent takes advantage of the structure of postal rate charts, i.e., the function which relates the weight of a mail piece to the appropriate postage amount. As can be seen in FIG. 1, such rate charts provide a constant postage value for all weights between pairs of predetermined breakpoints. The system of the '048 patent takes advantage of this by use of an algorithm where a first estimate of the weight is made and used to determine the postage amount, unless the first estimate is within a predetermined distance of a breakpoint, in which case a second more accurate estimate is made.

The transport assembly is comprised of a plurality of rollers independently supported by the mailing machine base in a manner which permits the rollers to assume a vertically engaged position (up position) in communication with the clamping assembly, or vertically disengaged position (down position) out of communication with the clamping assembly. Each roller is aligned to journey partly through a respective slot in the up position. A bi-directional drive motor assembly is in communication with each roller via a endless belt. The drive motor assembly includes a one way clutch interactive with the transport assembly such that motor actuation in a first direction results in the endless belt imparting a driving force to each roller and motor actuation in the second direction causes the transport assembly to reposition the rollers in the second position.

The mailing machine further includes a vertically displaceable platen assembly mounted to the base of the mailing machine and aligned for cooperatively acting with a suitable postage meter mounted to the postage meter support assembly.

In accordance with the present invention, a scale is provided wherein a mail piece is supported on a pan, which is in turn supported by a transducer for generation a series of signals representative of the instantaneous response of the pan when the mail piece is received. Typically, the transducer will include a load cell. A processor receives the output signals from the transducer and detects the presence of a mail piece on the pan.

In the present invention, a processor operates to determine weights for a representative series of mail pieces and the average time for determining such weights is approximately equal to a predetermined time. A first estimate for the weight is determined as a function of a series of signals where the difference between the maximum and minimum signals in the series is less than a predetermined threshold, and is used if the first estimate is not within a predetermined distance of a breakpoint, and a second, more accurate, estimate is used if the first estimate is within the predetermined distance. The first signal in the series is discarded as it is likely to be on the rapidly changing leading edge of the response of the pan to receipt of a mail piece.

In accordance with another aspect of the present invention, output signals from the transducer are processed by a low pass filter to filter frequencies above the above mentioned predetermined frequency. In accordance with this aspect of the subject invention, when a mail piece is detected on the scale pan, the filter may be operated at a higher sampling rate for a temporary period to increase its cut-off frequency and allow the filtered output of the transducer to reach its stable state more quickly. Alternatively, when a mail piece is detected on the scale pan the filter may be by-passed temporarily. Preferably this filter will be a digital filter.

Other capabilities and advantages of the present invention will be apparent or presented in the following detailed description of the invention and the attached drawings.

BRIEF DESCRIPTION OF THE DRAWINGS

FIGS. 8 and 8A are views of a tape module in accordance with the present invention.

FIG. 9 is a partial perspective view of the tape module.

DETAILED DESCRIPTION OF THE PREFERRED EMBODIMENT

The postage meter mailing machine, in accordance with the present invention, employs a novel modular architecture. That is, the mailing machine is comprised of subsystems which are not interdependent. Therefor, the mailing machine can be configured to include only those subsystems modules necessary to meet particular operational needs for a given application providing maximum application flexibility. For example, where the use environment is restricted to processing uniform mail, the scale module, subsequently described, may be omitted in substantial portion from the mailing machine without affecting the system performance of remaining modules or the system controller.

Figure 1:
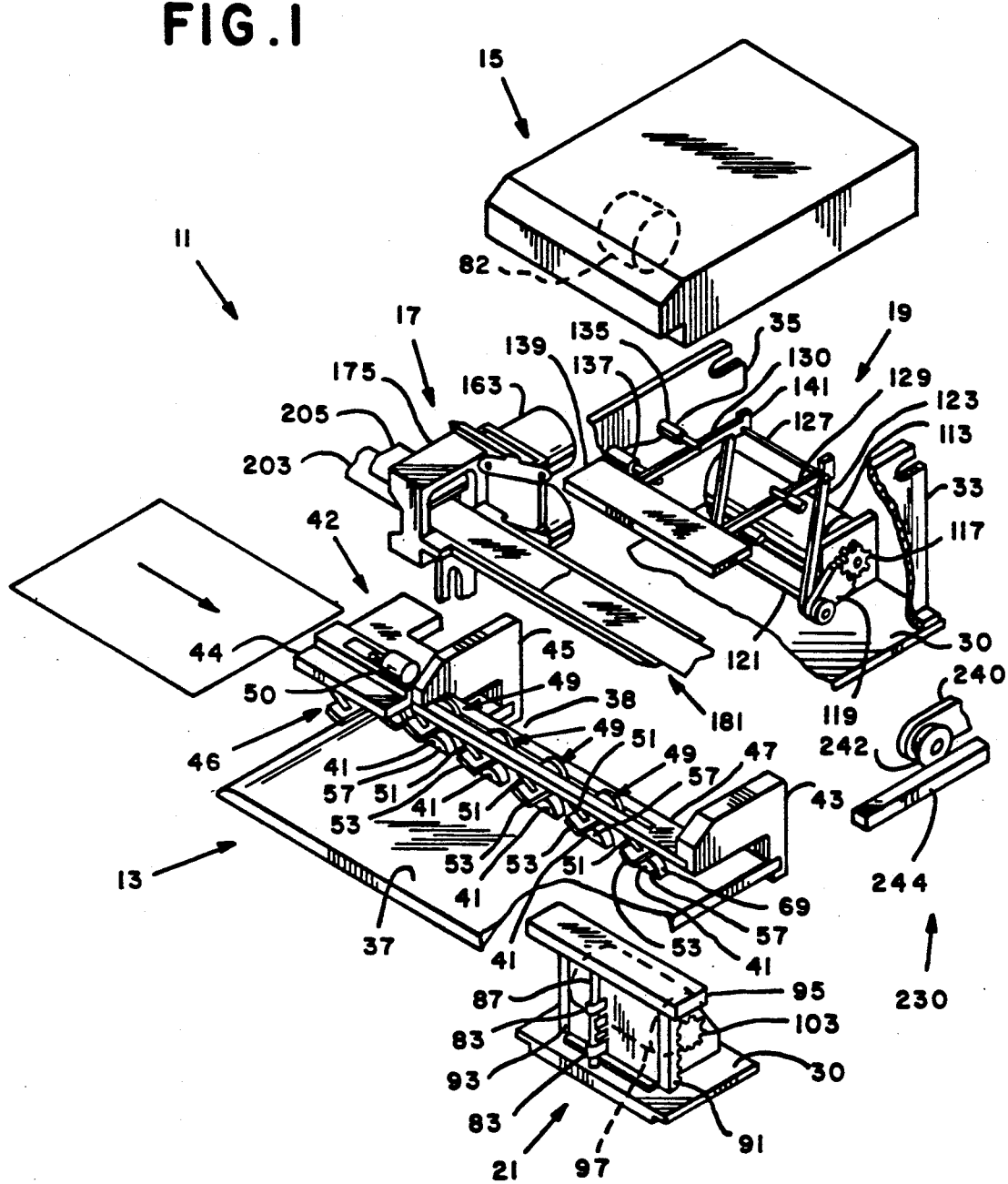
FIG. 1 is a sectioned exploded view of a mailing machine in accordance with the present invention.
Figure 2:
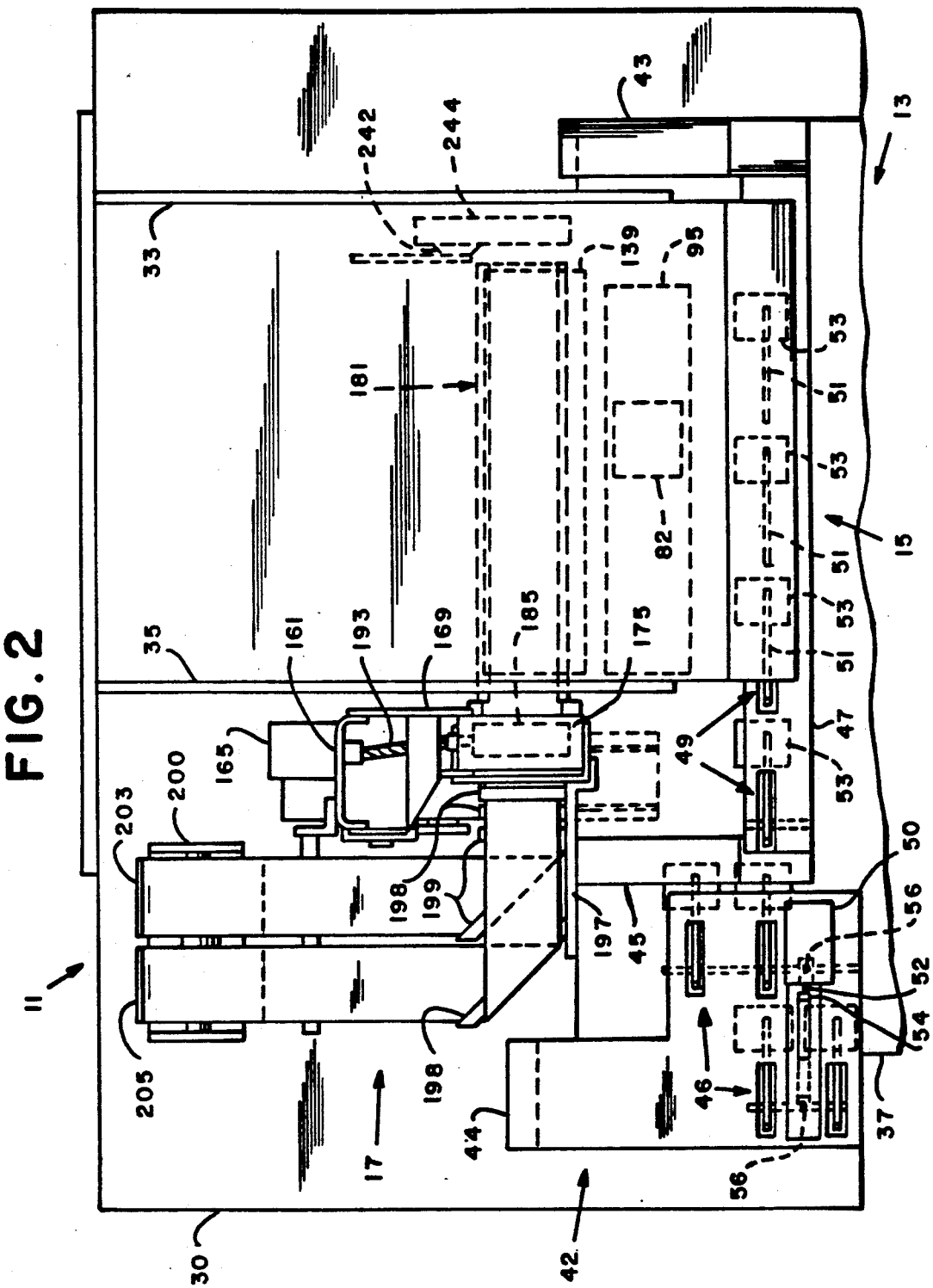
FIG. 2 is top view of the mailing machine.

Referring to FIGS. 1 and 2, a mailing machine, generally indicated as 11 and in accordance with the present invention, employs a novel subsystems modular architecture comprising a scale module 13, a transport module 12, a postage meter module 15, a tape feed module 17, a inking module 19, and a platen module 21. The modules are located within the mailing machine 11 such that the scale module 13 is located frontwardly of parallel support walls 33 and 35. The support walls 33 and 35 are fixably mounted to the mailing machine base 30 in lateral spaced apart relationship. Mounted to the base plate 30 between the support walls 33 and 35 is ink module 19. Mounted above ink module 19 to the support walls 33 and 35 is postage meter module 15. Platen module 21 is mounted to base 30 just below a registration portion of the postage meter 15, to be described more fully later. In addition, mailing machine 11 has mounted to wall 35 tape feed module 17 coactive in one embodiment with a tape cutting mechanism 230.

Figure 3:
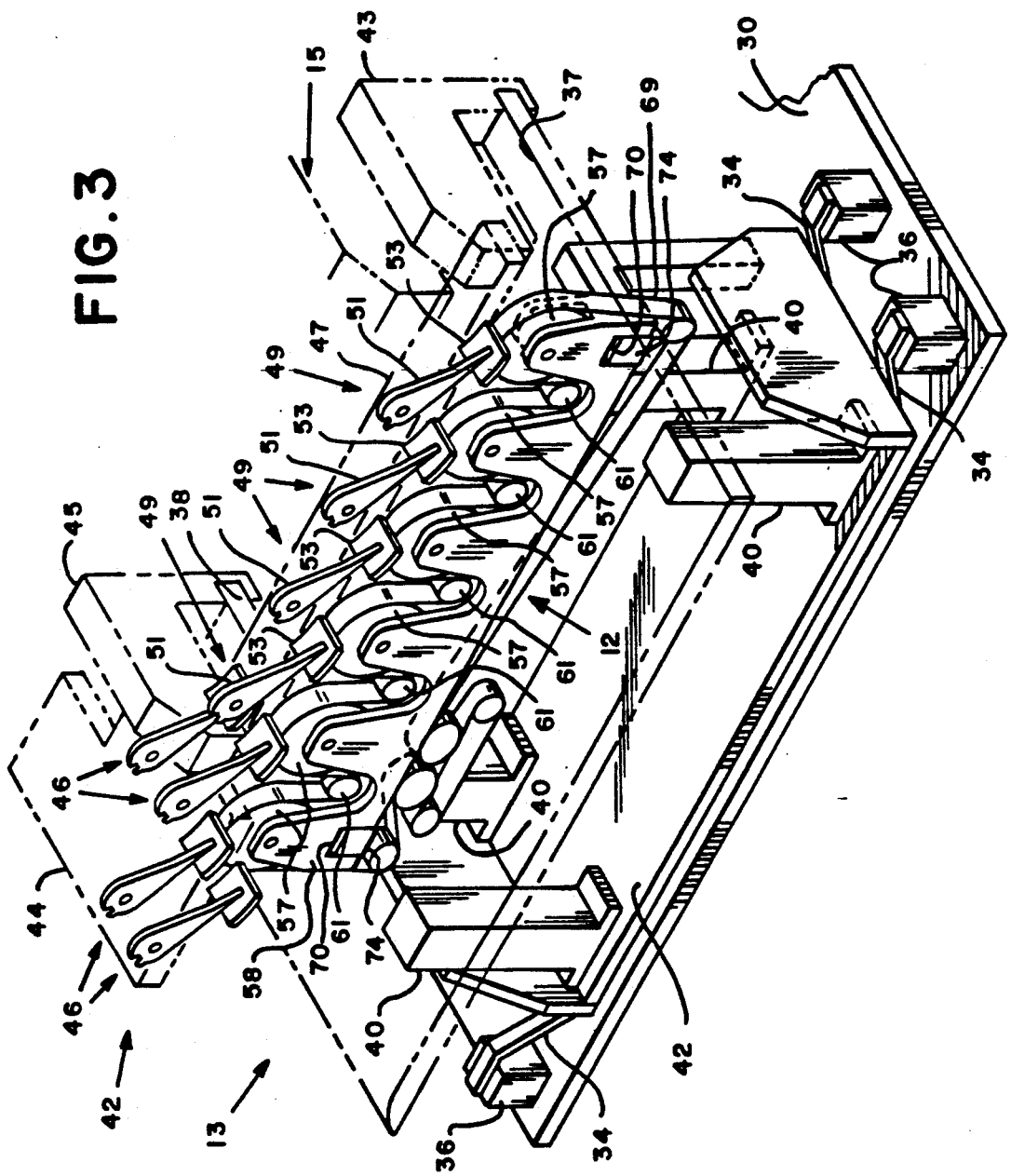
FIG. 3 is a perspective view of a portion of a resilient scale module, and transport module in accordance with the present invention.

Referring to FIGS. 1 and 3, scale module 13 is of the resilient type more fully described in U.S. Pat. No. 4,778,018, entitled APPARATUS AND METHOD OF DETERMINING THE MASS OF AN ARTICLE BY MEASURING THE SHIFT IN THE PERIOD OF HARMONIC MOTION, herein incorporated by reference. Briefly, the resilient type scale, most suited and described in the noted applications, utilizes the principles of harmonic vibration for the purpose of determining the weight of an article. A flexibly mounted platform (inclusive of members 37, 40, 43, 45, 47, and 49) is caused to oscillitate by an initial exitation action (not shown). The frequency of the oscillation is primarily dependent on the total mass of the platform and anything fixed thereto.

Referring particularly to FIGS. 1, 2, and 3, the scale module 13 is of the resilient type and includes a weighing plate 37 supported by vertical beam members 40 at one of their respective ends. The other end of each member 40 is fixably mounted to a counter plate 42. The mailing machine base 30 includes a plurality of scale support post 36 each support post 36 including a flex member 34. Each flex member 34 is fixably mounted to the counter plate 42 in such a way as to provide isolation mounting for the scale module 13 from the base 30.

The weighing plate 37 is generally rectangular in shape and includes a longitudinally extending recess 38 formed along the rearward side of the weighing plate 37 also formed in the weighing plate are a plurality of co-linearly aligned slots 41 (not shown in FIG. 3 for the purpose of clarity). A first generally C-configuration clamp 43 is fixably mounted along the rearward side of the weighing plate laterally to one side of the recess 38. A second generally C-configured clamp 45 is fixably mounted to the rearward side of the weighing plate 37 laterally to the other side of the recess 38. A support beam 47 (shown in phantom in FIG. 2 for the purpose of clarity) is fixably mounted at its ends to the respective clamps 43 and 45. Rotatably mounted by conventional means to the support beam 47 is a plurality of clamping members 49 each of which is mounted such that it is positioned over a respective one of said slots 41. Each of the clamping members 49 includes a mounting arm 51 rotatably mounted to the support beam 47 at one end and biased downwardly by any conventional means such as a spring. The other end of the mounting arm 51 has fixably mounted thereto a generally arched flange member 53 laterally sized to prevent the flange member 53 from venturing into a respective slot 41.

It should be appreciated that to the extent that the weighing function is not desired to be included, the scale module as afore described, inclusive of the functional capabilities cited in the applications herein incorporated, may be eliminated. The only modification or substitution necessary is the employment of a transport plate, of like construction to the weighing plate 37, which transport plate can be fixably mounted directly to mailing machine base 30 members 49. The members 43, 45, 47 and 49, in the preferred embodiment of this inventions, are maintained for interaction with the transport module in a manner hereafter described.

It is noted that as viewed in FIGS. 1, 2, 3, and 4, the mailing machine includes a sealing module, generally indicated as 42. Sealing module 30 is a comprised of a generally L-shaped support member 44. Support member 44 is fixably mounted at one end to the mailing machine base 30. The other end of support member 44 rotatably supports a plurality of sealing members 46 biased downwardly by a respective spring 48. Sealing members 46 are aligned longitudinally in a generally staggered relationship and include tab 56. A solenoid 50 is fixably mounted to the support member 44 such that solenoid piston arm 52 abuts the sealing member tab 56. Actuation of solenoid 50 causes solenoid piston arm 52 to displace transfer link 54 which thereby causes sealing members 46 to rotate to a spaced apart relationship to weighing plate 37 during the weighing process.

Figure 4:
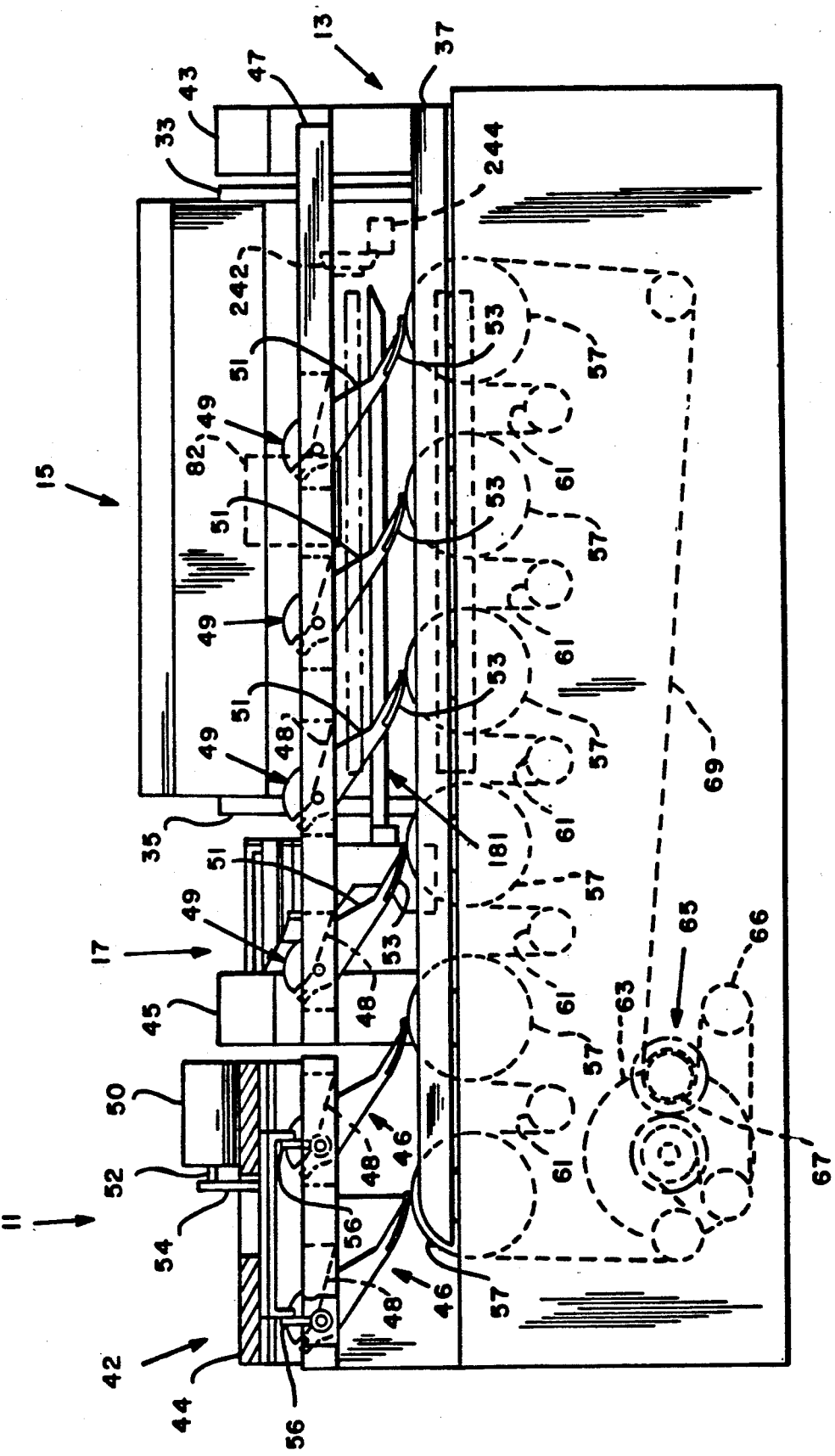
FIG. 4 is a sectioned elevational view of the mailing machine.
Figure 5:
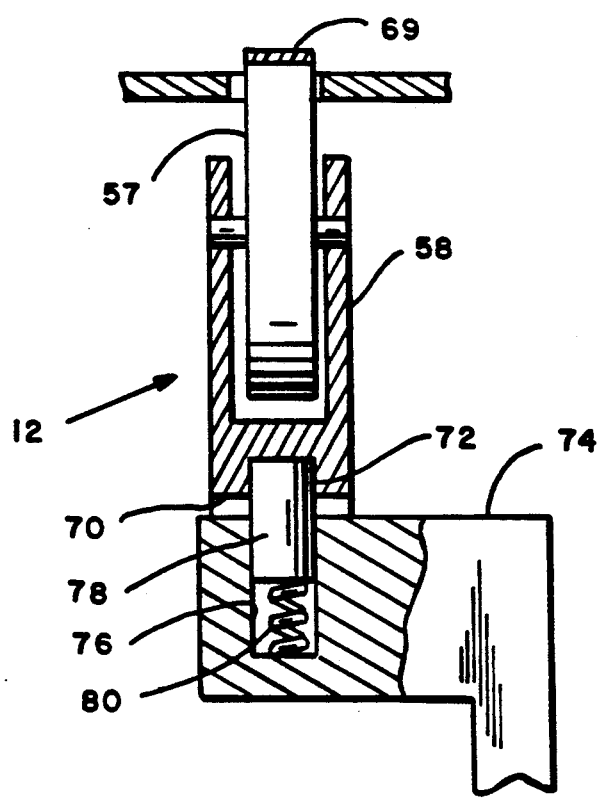
FIG. 5 is a section side view of the transport module frame support member.

Referring to FIGS. 2, 3, and 4, transport module 12 is comprised of a plurality of first guide rollers 57 are rotatably mounted to a frame 58 (best shown in FIGS. 3 and 4). The frame 58 includes support seats 70, each seat 70 having a resident seat 72. A plurality of generally L-shaped support member 74 are fixably mounted at one end to the base 30 such that they do not interfere with the counter plate 42 of the scale module. The other end of the support member 74 receives a respective seat 70 of the frame 58. Each support member 74 includes a seat 76 having a guide pin 78 biased in the vertically upward direction by a spring 80 residing therein. A portion of the guide pin 78 also, in part, resides in the seat 72 of the respective frame seat 72.

Also rotatably mounted to the frame 58 are a plurality of rollers 61 positioned vertically downwardly from and between a adjacent guide rollers 57. Fixably mounted to base 30, by any conventional means, so as not to interfere with the operation of the scale module 13, is a bi-directional drive motor 63 and associated drive train, generally indicated at 65. An endless belt 69 is placed in driving communication with the drive train 65 which includes a one way clutch arrangement, generally indicated as 67. The endless belt 69 is positioned in a serpentine manner around rollers 57 and 61 thereby providing driving communication between the drive motor 63 and the rollers 57.

When belt 69 is driven in the envelope feed direction of the mailing machine by the drive motor 63 as permitted by the one-way clutch 67, the frame 58 will assume the nominal or first position pursuant to the urging of the spring biased guide pin 78. In the first position, the rollers 57 are positioned by the frame 58 to extend through and slightly above a respective slot 41 in the weighing platform 37. When the belt 69 is driven in a reverse direction to the envelope feed direction, the one-way clutch prevents continued displacement of the belt 69, causing the belt 69 to impart a downward force on the frame 58 overcoming the biasing force of the springs 80. As a result, the frame 58 is displaced downward to a second position causing the rollers 57 to be withdrawn from the slots 41. It is noted that the drive train 65 includes a take-up roller 66 biased in a conventional manner such that when the frame 58 is in the second position, the take-up maintains the belt 69 in a taut condition.

It is now apparent that when the rollers 57 are withdrawn from the slots 41, the clamps 47 bias a envelope on the weighing plate there against which facilitates the weighing process. When the rollers 57 are journeyed partially into the slots 41, the clamps 47 assist the transport function.

Figure 6:
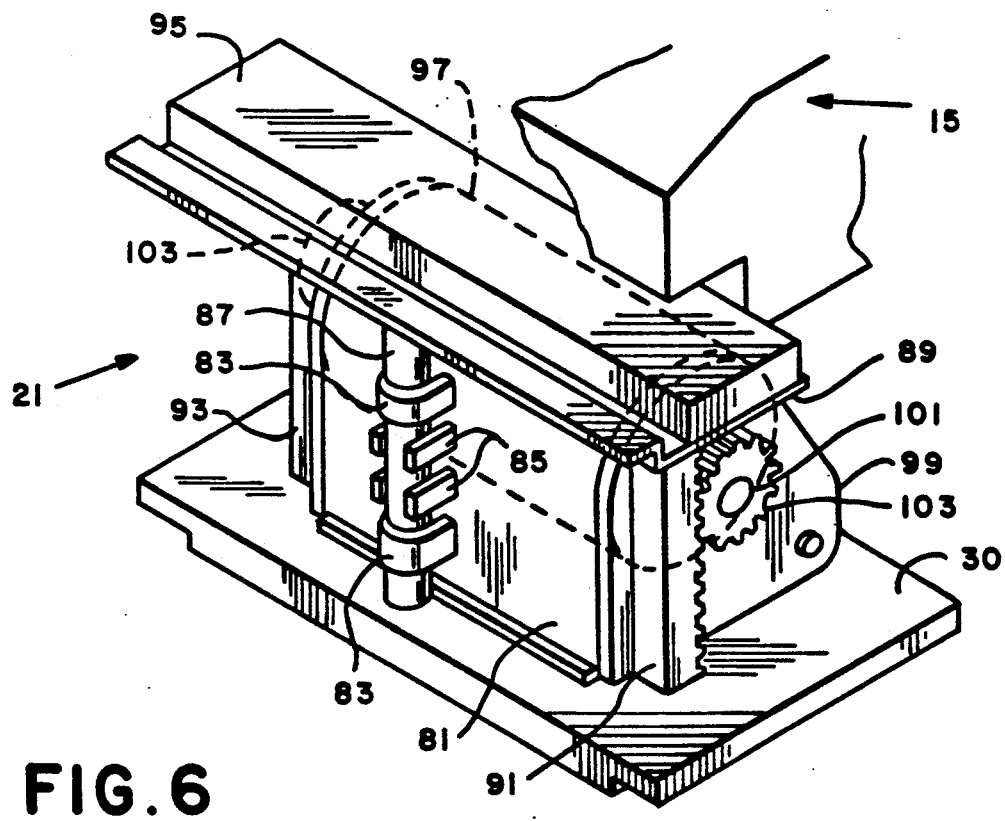
FIG. 6 is a perspective view of a platen module in accordance with the present invention.

Referring to FIGS. 1, 2, 4, and 12, and more particularly to FIG. 6, as afore noted, postage meter 15 is mounted between support walls 33 and 35. The postage meter includes a forwardly located registration area generally indicted as 82. Mounted to base 30 of the mailing machine just below register area 82 of postage meter 15 is platen module 21. Platen module 21 includes a support wall 81 fixably mounted to base 30. A plurality of C-brackets 83 and guide pins 85 are fixably mounted to one face of support wall 81 in vertical alignment to allow a platen guide rod 87 to vertically slide along a defined vertical path. Platen guide rod 87 is laterally captured by the C-brackets 83 and guide pins 85 and has fixably mounted to its top a platen plate 89. Also fixably mounted to the platen plate in laterally spaced relationship is a first and second rack post 91 and 93, respectively. Fixably mounted atop the platen plate 89 is a elastomeric material having a generally rectangular shape of uniform thickness.

A drive motor 97 is mounted to and between parallel support brackets 99 such that the rack posts 91 and 93 are outboard of the respective brackets 99. Drive motor 97 includes a drive shaft 101 which extends axially through drive motor 97. At each end of drive shaft 101 is fixably mounted a gear 103 aligned to be in constant mesh with a respective rack post 91 and 93. It is now appreciated that actuation of the drive motor 97 can cause the rack post to elevate platen plate 89 to bring elastomeric member 95 into engagement with a properly positioned envelope in the meter register projection area and, in so doing, cause an indicia to be imprinted on the envelope.

Figure 7:
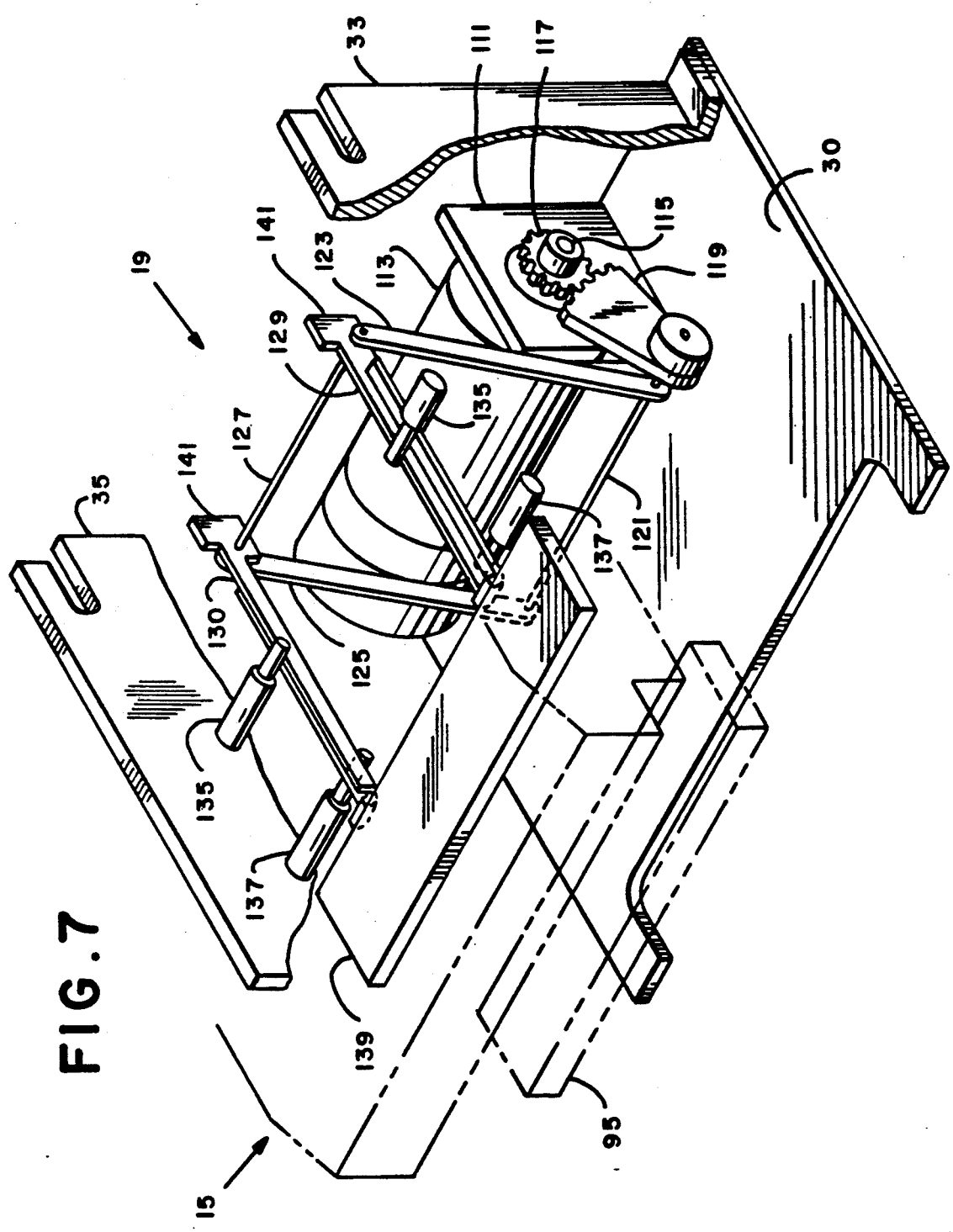
FIG. 7 is a perspective view of a inking module in accordance with the present invention.
Figure 12:
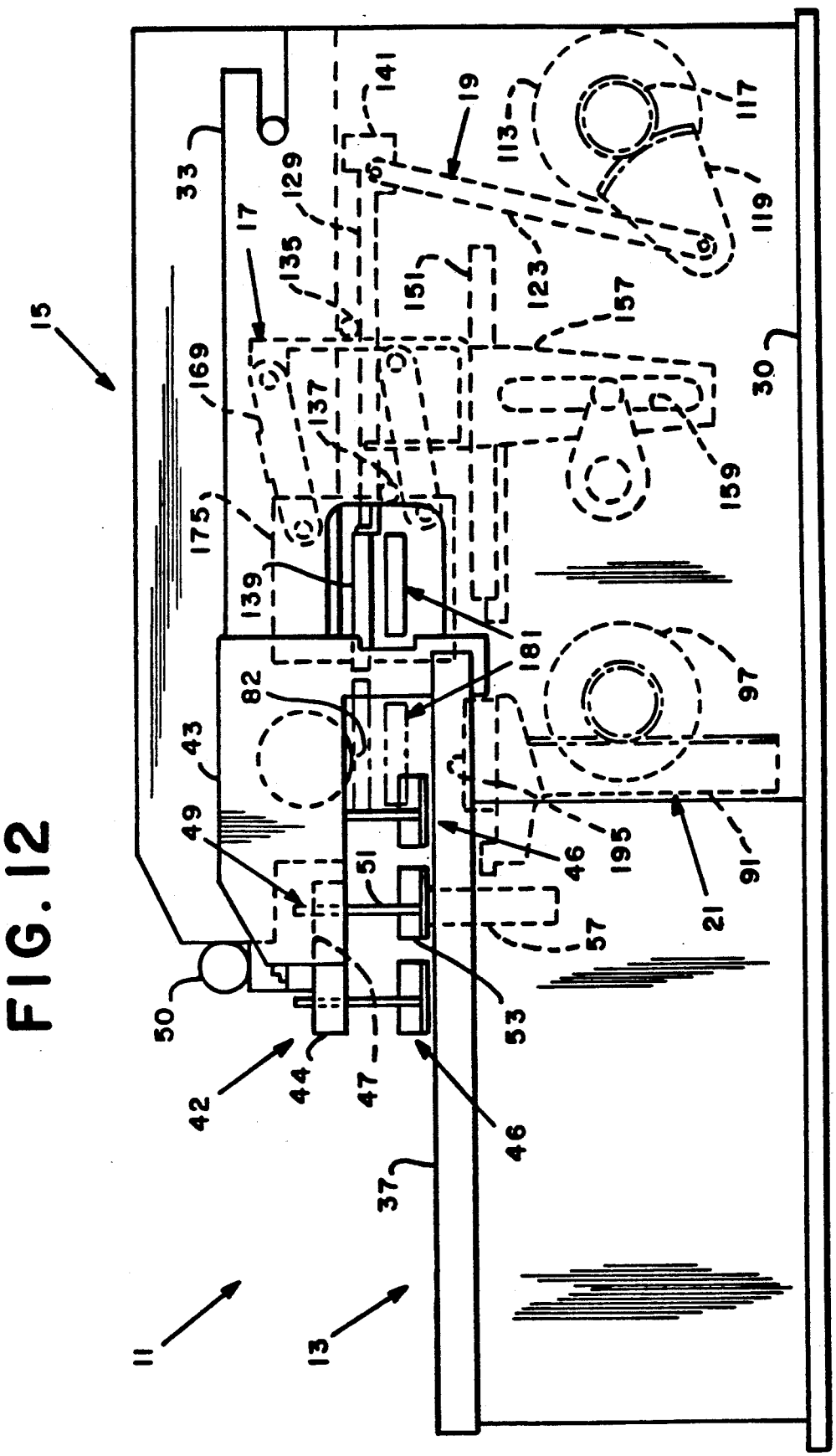
FIG. 12 is a side elevational view of the mailing machine.
Figure 13:
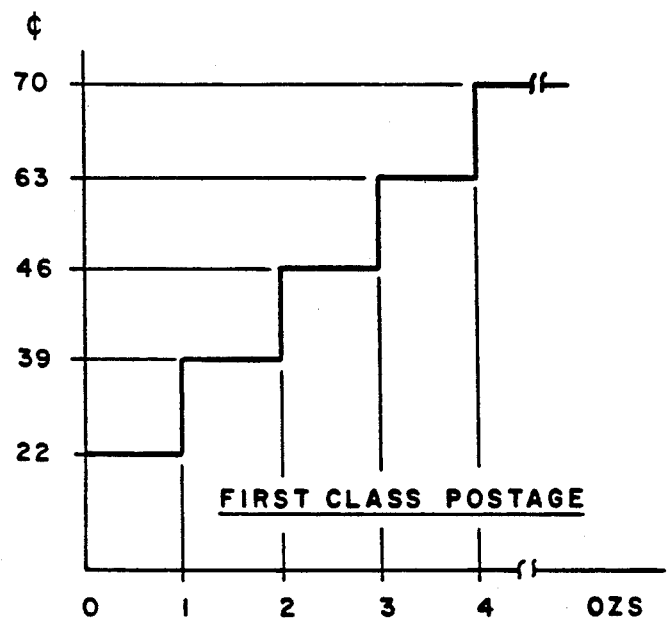
FIG. 13 shows a typical postal rate chart.

Referring now to FIGS. 1, 7, and 12, inking module 19 is located between support walls 33 and 35 of the mailing machine 25. A motor mounting plate 111 is fixably mounted vertically to base plate 30. A drive motor 113 is fixably mounted to motor mounting plate 111 such that output shaft 115 extends through plate 111. Fixably mounted around one end of output shaft 115 outboard of the plate 111 is a gear 117. A second gear 119 is pivotally mounted to base 30 in constant mesh with gear 117. A linkage assembly comprised of a driving shaft or first link 121 is fixably mounted to second gear 199 at one end. Fixably mounted along first link 121 is a second link 123 and a third link 125 in spaced parallel orientation a fourth link 127 is pivotally mounted at its respective ends to a respective link 125 and 123. A first and second transfer link 129 and 130, respectively, are pivotally mounted in spaced apart relationship at one end to fourth link 127. Fixably mounted inboard to each of support walls 33 and 35 is a first guide pin 135 and a second guide pin 137.

Each of transfer links 129 and 130 extend respectively below a guide pin 135 and above a guide pin 137 such that the guide pins 135 and 137 act to guide the longitudinal displaceable path, respectively, of transfer links 129 and 130. Guide pins 135 and 137 also provide vertical support. Fixably mounted to the forward end of each of the transfer links is an ink pad well 139 in which an ink pad resides (not shown). At the other end of each of the transfer links 129 and 130 is formed a tilting surface 141. It can therefore be appreciated that upon actuation of the motor 113 the linkage assembly is driven forwardly. Pins 135 are positioned such that when ink pad tray 139 is positioned just below register area 85 of the meter 15 tilt surface 141 is brought into forced engagement with pin 135 causing transfer links 130 and 129 to be tilted upwardly, elevating ink pad well 139 into engaging contact with register area 85 of meter 15.

Referring now to FIGS. 1, 4, 8, 9, 10, and 12, tape module 17 is slidably mounted to wall 35 along a track 150 formed along the outboard side of wall 35. The tape module consists of rail 151 which is slidably mounted longitudinally to track 150 to define the longitudinal displacement path of tape module 17. A bracket 155 is fixably mounted to rail 153. A second bracket 157 having a generally vertically extended slot 159 is mounted to bracket 155. Bracket 155 includes a first set of longitudinally aligned bracket flanges 167. Pivotally mounted to each of flanges 167 is one end of a first pivot arm 169. The bracket 155 further includes a second set of bracket flanges 171 which, in like manner, has pivotally mounted thereto, respectively, one end of a second pivot arm 173. The other end of each pivot arm 169 and 173 is pivotally mounted to a tape guide housing 175.

Tape guide hosing 175 has an entrance 177 aligned opposite an exit 179. Fixably mounted in a cantilever fashion to tape guide housing 175 to extend outwardly from exit 179 of tape guide housing 175 is a tape track 181 having a wedged shape feed member 183 extending partially into tape guide housing 175. Tape track 181 and feed member 183 are mounted to side walls of housing 175 to laterally extend across exit 179. It is noted that tape track 181 is comprised of a first and second channeled side walls 174 and 176, respectively, having a strip member 178 supported by and longitudinally between the side walls' channel (ref. to FIG. 7a). Rotatably mounted in the tape guide housing 175 is a first and second tape drive roller 185 and 187, respectively. Rotatably mounted in housing 175 opposite first drive roller 185 is a first idler roller 187 and, in like manner, a second idler roller 191 is rotatably mounted opposite second tape driver roller 187. A flexible shaft 193 communicates first motor 163 to the first tape drive roller 185 and, in like manner, a second flexible shaft 195 communicates the second tape drive motor 165 with second tape drive roller 187.

Housing 175 further includes a flanged portion 197 having fixably mounted thereto a plurality of first guide pins 198 and a plurality of second guide pins 199. A dual tape support assembly 200 is fixably mounted to the base 30 and rotatably supports a first and second roll of tape 203 and 205, respectively. First roll of tape 203 is threaded such that the guide pins align tape 203 for journey into the housing 175 and tape track 181. Tape 103 is located in tape track 181 so as to be captured between channeled side walls 174 and 176 resting on strip 178. As shown in FIG. 8 and in accordance with the preferred embodiment of the invention, tape 203 is a backing tape supplied with sufficient backing lead such that backing 180 will extend in a reverse direction below and between idle roller 191 and drive roller 187 such that actuation of drive roller 187 on tape backing 180 causes tape 203 to be advanced and the backing pealed away. Tape 205 is journeyed around pin 198 to pass between idle roller 198 and drive roller 185 and into tape track 181 to rest on tape 203 and captured between channeled side walls 174 and 176.

Optionally, it may be desired for tape 203 to be of the phantom type. As indicated in phantom in FIG. 9, the tape can be optionally threaded directly between rollers 187 and 191 of track 181.

Figure 10:
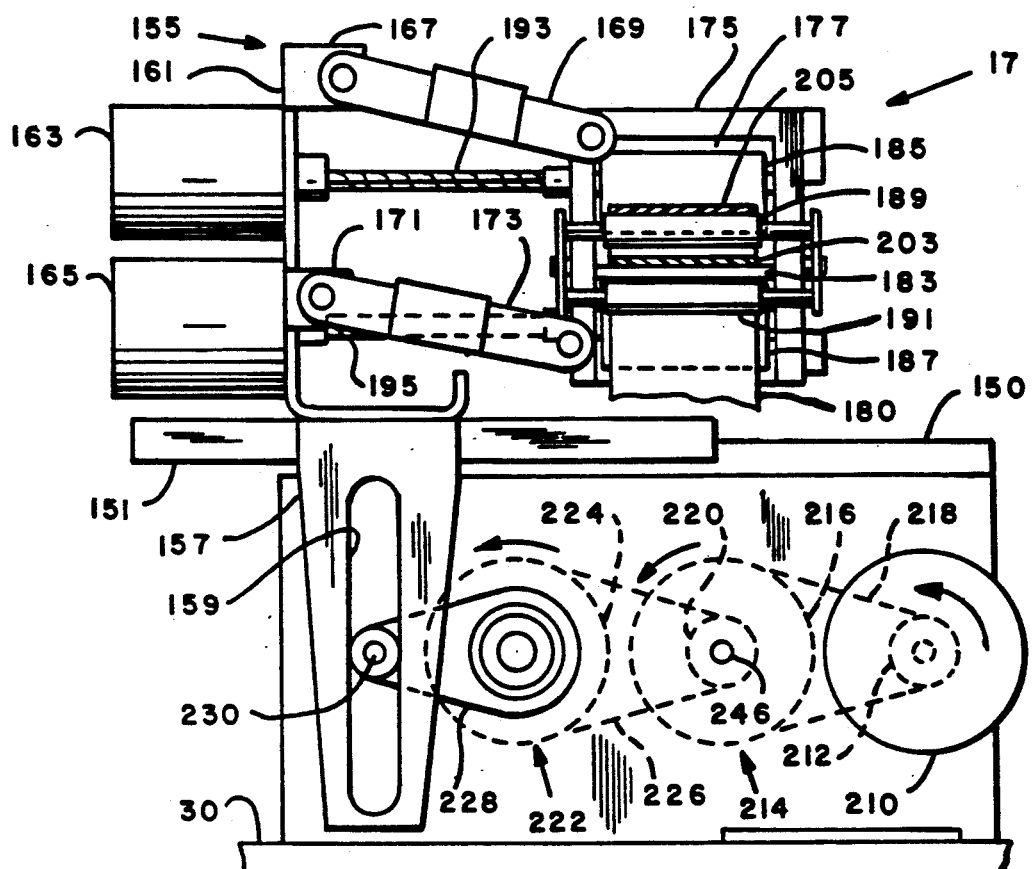
FIG. 10 is a side elevational view of the tape module.

Referring more particularly to FIGS. 10 and 12, tape module 17 is slidable along a track 150 formed in wall 35 pursuant motivation of second bracket 157. It is noted that tape module 17 is so positioned relative to registration area 80 of postage meter 15 and platen module 21 that track 181 is located in a first position between postage meter registration area 80 and the platen module 21. In a second position the track 181 is repositioned below the postage meter 15 clear of platen plate 89 travel. The position of rack 150 is dependent upon the location of the second bracket 157.

In order to motivate second bracket 157 and, in turn position track 181 in the first (as shown in phantom in FIG. 12) or second position, a motor 210 is fixably mounted to the mailing machine base 30. Fixably mounted around the output shaft of motor 210 is a pulley 212. Rotatably mounted to wall 35 is a double pulley assembly 214 which includes a first pulley 216 and second pulley 220. First pulley 216 is in driven communication with motor 210 through an endless belt 218 journeyed between pulleys 212 and 216. A crank assembly 222 is rotatably mounted to wall 35 and includes a pulley 224 in driven communication with pulley 220 of pulley assembly 214 through an endless belt 226. Crank assembly 214 also includes a crank arm 228 having a slide pine 230 residing in slot 159 of bracket 157 of tape module 17.

Motivation of tape module 17 along track 150 is accomplished by causing motor 212 to rotate the pulley 212 in the direction shown in FIG. 10. The rotation of pulley 212 is transferred to pulley 224 of crank assembly 222 through double pulley assembly 214 by belts 218 and 216. The rotation of pulley 224 through one-half revolutions causes tape module 17 to displace from the first position to the second position. Further actuation of motor 210 causes the pulley 224 to further rotate to complete the revolution resulting in the tape module returning to the first position.

Figure 11:
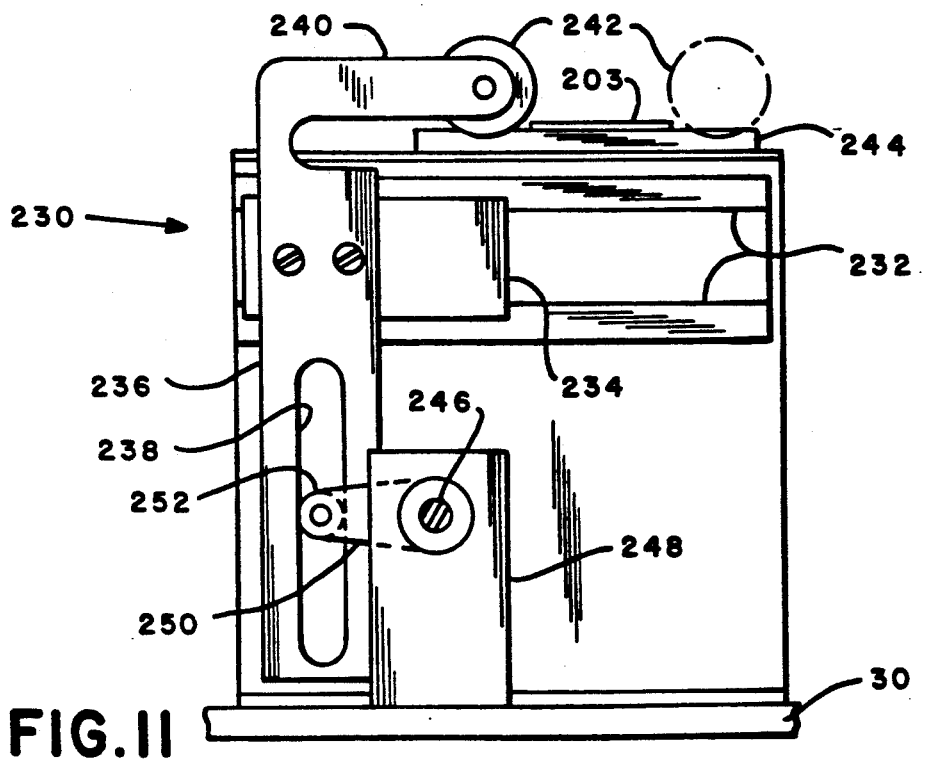
FIG. 11 is a side elevational view of a cutting module in accordance with the present invention.

Referring to FIG. 11, the mailing machine of the present invention may further include a tape cutter module 230. Tape cutter module 230 is comprised of dual track 232 mounted outboard of wall 33. A member 234 is slidably mounted to track 232. Lever arm 236 having a vertically directed slot 238 is fixably mounted to the member 34. The lever arm 236 includes a portion 240 which extends in a horizontal cantilevered manner and has a rotary blade 242 rotatably mounted to the end of the lever portion 240. A cutter beam 244 is mounted to wall 33 to cooperatively act with the rotary blade 242.

Actuation of the cutter module 230 is provided by motor 210. When the mailing machine includes the cutter module 230 double pulley 214 is comprised such that in a first direction (as shown by the arrows in FIG. 10) displacement of pulley 216 is directly transferred to the pulley 220 without causing the shaft 246 to rotatably respond. Displacement in the opposite direction of the pulley 214 caused by reverse drive of motor 210 results in pulley 214 rotating the shaft 246 while pulley 220 remains stationary. Pulley 214 and shaft 245 arrangement can be of a conventional slip double pulley construction.

Shaft 246 extends longitudinally to and is rotatable mounted in a support member 248 fixably mounted to base 30 of the mailing machine. Fixably mounted around a portion of shaft 246 generally adjacent to member 248 is a crank arm 250. The crank arm 250 includes a pin 252 slidably captured in slot 238 of lever arm 236 such that upon initial one-half rotation motor 210 in the reverse direction, acting through the double pulley shaft 246 causes the lever arm 236 to be displaced by crank arm pin 252 to a second position (indicated in phantom in FIG. 11). Further actuation of motor 210 in the reverse direction causes pulley 224 to further rotate to complete the revolution resulting in the rotary cutter blade in coaction with beam 244 to cut a tape 205 segment.

In the preferred embodiment, it is intended that the mailing machine 11 operate such that transport module 12 receives a envelope from a suitable feed mechanism (not shown). The transport system properly positions the envelope on the weighing plate relative to the meter module 15. The transport rollers 57 are then caused to withdraw, in the manner afore described, under the influence of the motor 63. Simultaneously, the inking module 19 has been actuated, in the manner afore described, to apply imprinting ink to the registration area of postage meter module 15 and withdrawn to the first position prior to the arrival of the envelope. Upon the arrival of the envelope in proper position at the process station and withdrawal of the transport rollers 57, scale module 13 will weigh the envelope, in a manner described in U.S. Pat. No. 4,788,018 and inform the meter for meter setting, in a manner described in U.S. Pat. No. 4,953,996 entitled PRINTWHEEL SETTING DEVICE FOR A POSTAGE METER. Subsequent to weighing of the envelope, the platen module 21 is actuated, in the manner as afore described, to result in the imprinting of an indicia on the envelope. Simultaneously with actuation of platen module 21 or pursuant to a minimum time lag, transport module 12 can be reactivated or further activated to return the rollers 57 to their first position. Upon obtainment of the first position of the rollers 57, the envelope is discharged from the mailing machine. Simultaneously with commencement of discharge of the process station envelope from the process station, a new envelope may be received by transport module 12.

Figure 14:
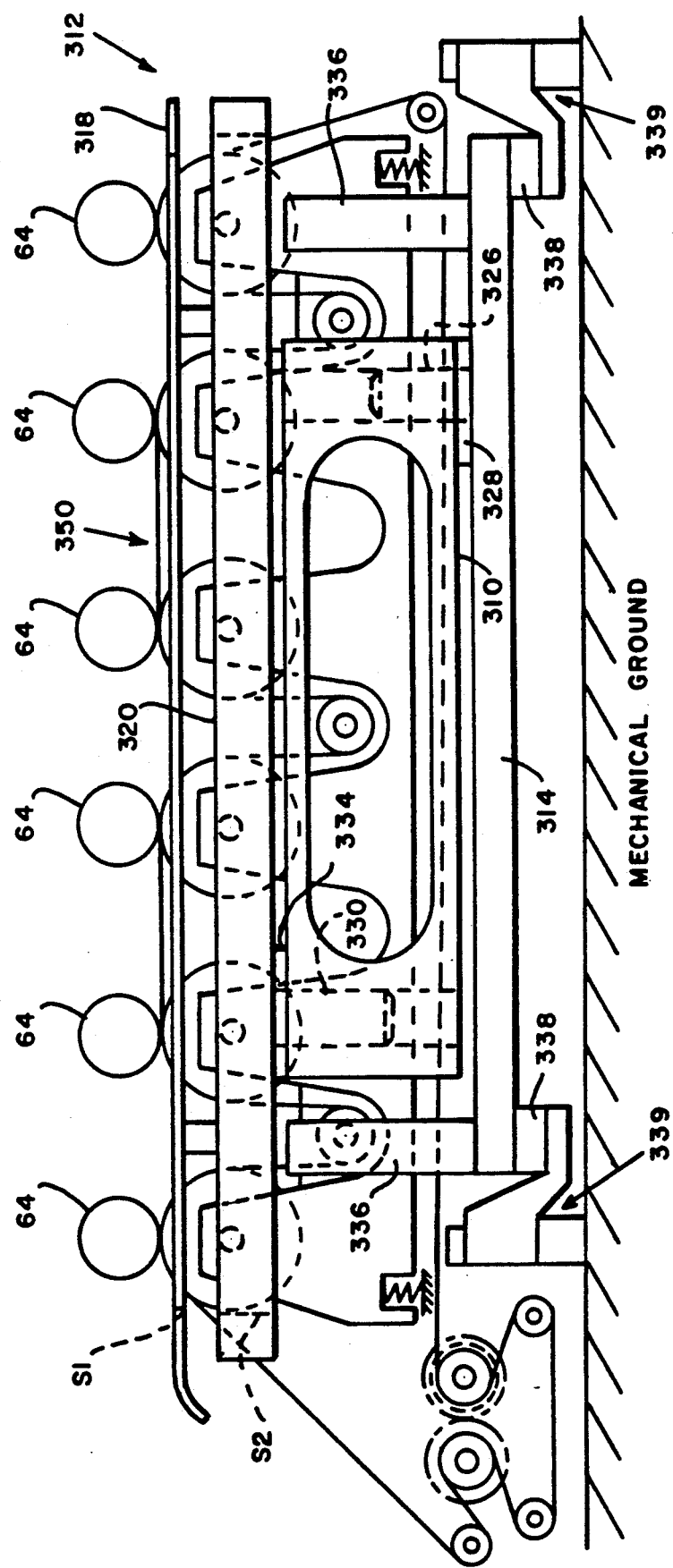
FIG. 14 shows a schematic side view of a scale module including scale pan and load cell transducer structure in accordance with the subject invention.

Referring to FIG. 14, a schematic diagram shows a side view of a weighing module in accordance with one embodiment of the subject invention. The module can be used in the high speed mailing system described above as a replacement for the resilient type scale system also described above.

In FIG. 14, a commercially available load cell supports a pan assembly 312 on scale base 314. Load cell 310 is fastened to base 314 by bolt 326 and spacer 328. Assembly 312 is fastened in a similar manner to load cell 310 by bolt 330 and spacer 334. This manner of mounting a scale pan is conventional and results in load cell 310 acting as a four bar linkage which deflects vertically in response to loads on pan 318.

The weighing module of FIG. 14 also includes stops 336, which protect load cell 310 against excessive deflections. Base 314 is supported on mechanical ground by resilient supports 338 and adaptor structures 339, which are substantially rigid so that supports 338 are at mechanical ground. Preferably supports 338 are formed of a vibration damping material, as is taught in U.S. Pat. No. 4,479,561 to Feinland et al.

Scales and weighing modules comprising pan supported on a base by a load cell mounted as a four bar linkage are well known in the art and, in general, a more detailed description of their construction is not believed necessary for an understanding of the subject invention.

The weighing module also is associated with a transport mechanism 350 for transporting mail pieces onto pan 318 in a controlled and repeatable manner. Transport 350 is substantially similar to transport module 12 described above, but includes rollers 64 which bear on the envelope, rather than allowing flanges 55 to bear directly on the envelope.

Transport 350 projects above the surface of pan 318 through slots s1 and s2 provided in pan 318 and structure 320 respectively, so that a mail piece which is fed from a feed mechanism (not shown) is transported to a position above but not on pan 318 by transport 350.

Pan 318 and structure 320 are formed to allow appropriate clearance for the operation of platen module 21 as described above.

In another embodiment of the subject invention, a transport system may be mounted on the pan assembly of a weighing module so that the entire weight of the transport system forms part of the tare of the weighing module. Such a system is described, for example, in the above mentioned U.S. Pat. No. 4,742,878; which is also hereby incorporated by reference.

In general details of the construction of transport systems for transferring mail onto weighing modules are not considered as part of the subject invention nor as necessary for an understanding of the subject invention. However, it should be recognized that transfer of the mail piece onto the weighing module in a controlled and repeatable manner is advantageous in making a rapid determination of the weight of the mail piece.

Figure 15:
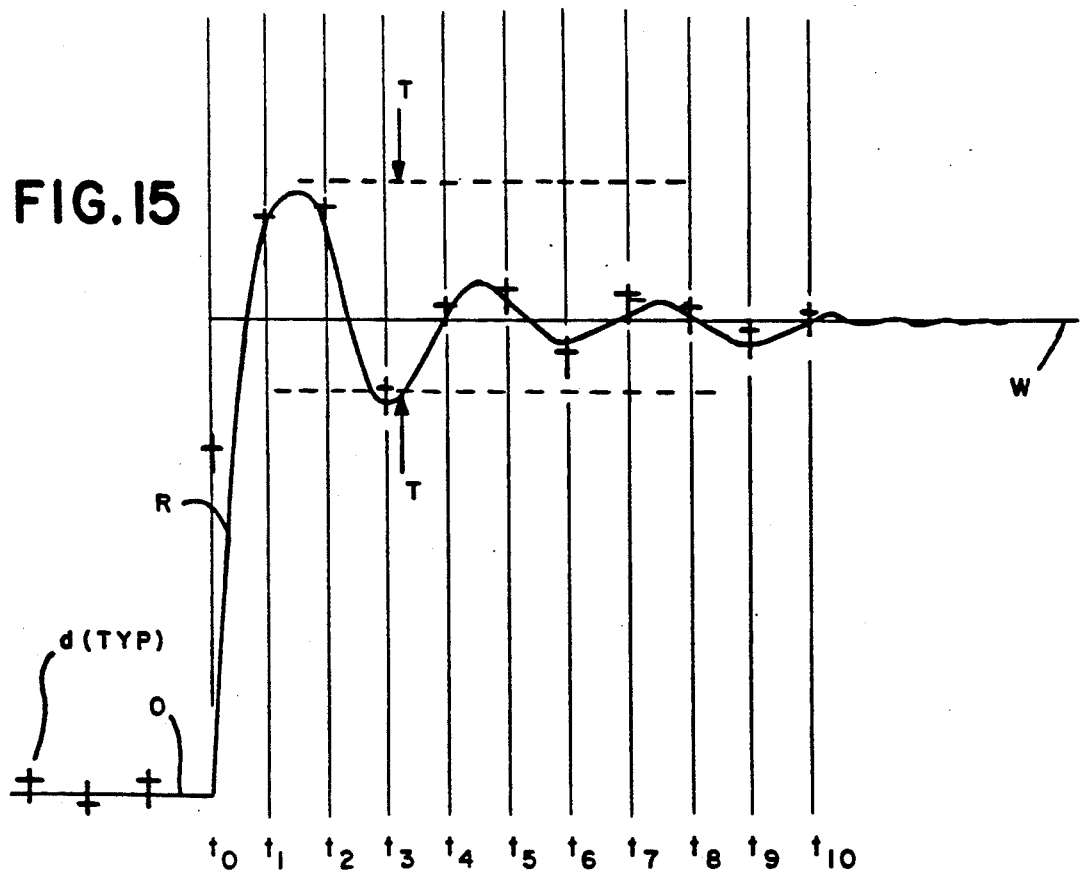
FIG. 15 shows a graphic representation of the instantaneous response of the scale pan to application of a mail piece and the corresponding transducer output.

FIG. 15 shows a graphic representation of the response of pan assembly 312 when a mail piece is applied. At a time prior to a signal is received indicating that a mail piece has been applied. Preferably this signal will be generated by the system when transport 350 is stopped and lowered to apply the mail piece. As can be seen in FIG. 15 the response R rapidly raises from the zero value and then shows a damped oscillation which converges to a value W representative of the weight of the applied mail piece. Beginning at time to digital signals d representative of response R are produced, as will be described further below.

Figure 16:
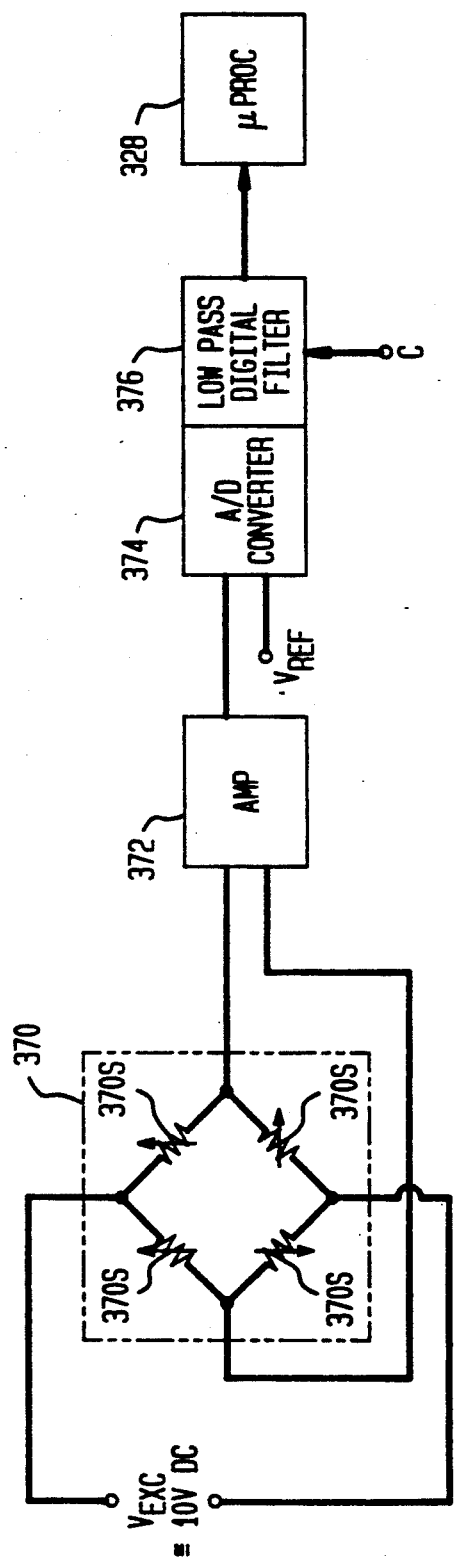
FIG. 16 shows the electronic circuitry of the load cell transducer of FIG. 2.

FIG. 16 shows circuitry which converts the mechanical displacement of load cell 310 into digital signals d for further processing. Strain gauge 370 comprises four strain sensors 370s which are physically fixed to load cell 310 in a conventional manner, and which are resisted elements whose resistance changes in response to strain in load cell 320. Sensors 370s are connected to form a bridge circuit which is excited with a dc voltage. The output of strain gage 370 is an analog electrical signal representative of the mechanical displacement of load cell 310 and, correspondingly, pan 318 in response to the application of a mail piece. This signal is amplified by amplifier 372, which is preferably an instrumentation amplifier, such as the Model AD624, available from Analog Devices Inc. This amplified signal is then input to a commercially available analog-to digital converter (A/D) 374 where it is converted into a series of digital signals representative of samples of the analog signal, as shown in FIG. 15.

The digital signals are then processed by a low pass digital filter 376. Preferably such filter 376 would be a six pole Bessel filter which may be implemented in either a) a known matter in any of a number of commercially available microprocessors especially adapted for digital signal processing; or b) within an A/D of the sigma-delta type, which contains an integral six-pole Bessel filter and whose digital output is already filtered. Preferred A/D's which include such filters based on digital signal processing techniques and which have a conversion rate sufficiently high for fast weighing are Models 5501 and 5503, available from Crystal Semiconductor Corp. Filter 376 is helpful to minimize the affects of vibrations felt by load cell 310 which are above the cutoff frequency of filter 376. In a preferred embodiment of the subject invention which is intended to determine the weights of a representative series of mail pieces within an average time of approximately 250 milliseconds this cut off frequency is approximately five Hz. Because of digital filtering is substantially an averaging process over at least one cycle of a frequency of interest it is not possible to filter lower frequencies within the desired time constraints of this embodiment of the subject invention.

Accordingly, in accordance with a preferred embodiment of the subject invention, pan assembly 312 and load cell 310 should be constructed and connected to form a structure which is sufficiently stiff in relation to its mass that it will have no substantial resonances (i.e., frequencies at which the structure naturally tends to vibrate) below a selected frequency, where the period of this selected frequency is substantially less than the predetermined average time for determining the weight of a mail piece (and the period of the cut off frequency of the filter). Pan assembly 12 may be stiffened in various conventional manners know to those skilled in the art, such as addition of supporting ribs, or its mass may be reduced by selectively drilling holes, etc. Load cell 310 may be stiffened by providing a load cell whose capacity is substantially greater than that required for the application. For example, where load cell 10 is to be used in a mailing machine such as that described in the above mentioned U.S. Pat. No. 5,082,072, where the maximum weight for a mail piece is expected to be on the order of a pound, a load cell capable of handling up to about 15 lbs may be used to provide the necessary stiffness.

Signals d which are output by low pass filter 376 are received by microprocessor 378 and processed to determine the weight of the applied mail piece as will be described further below.

Figure 17:
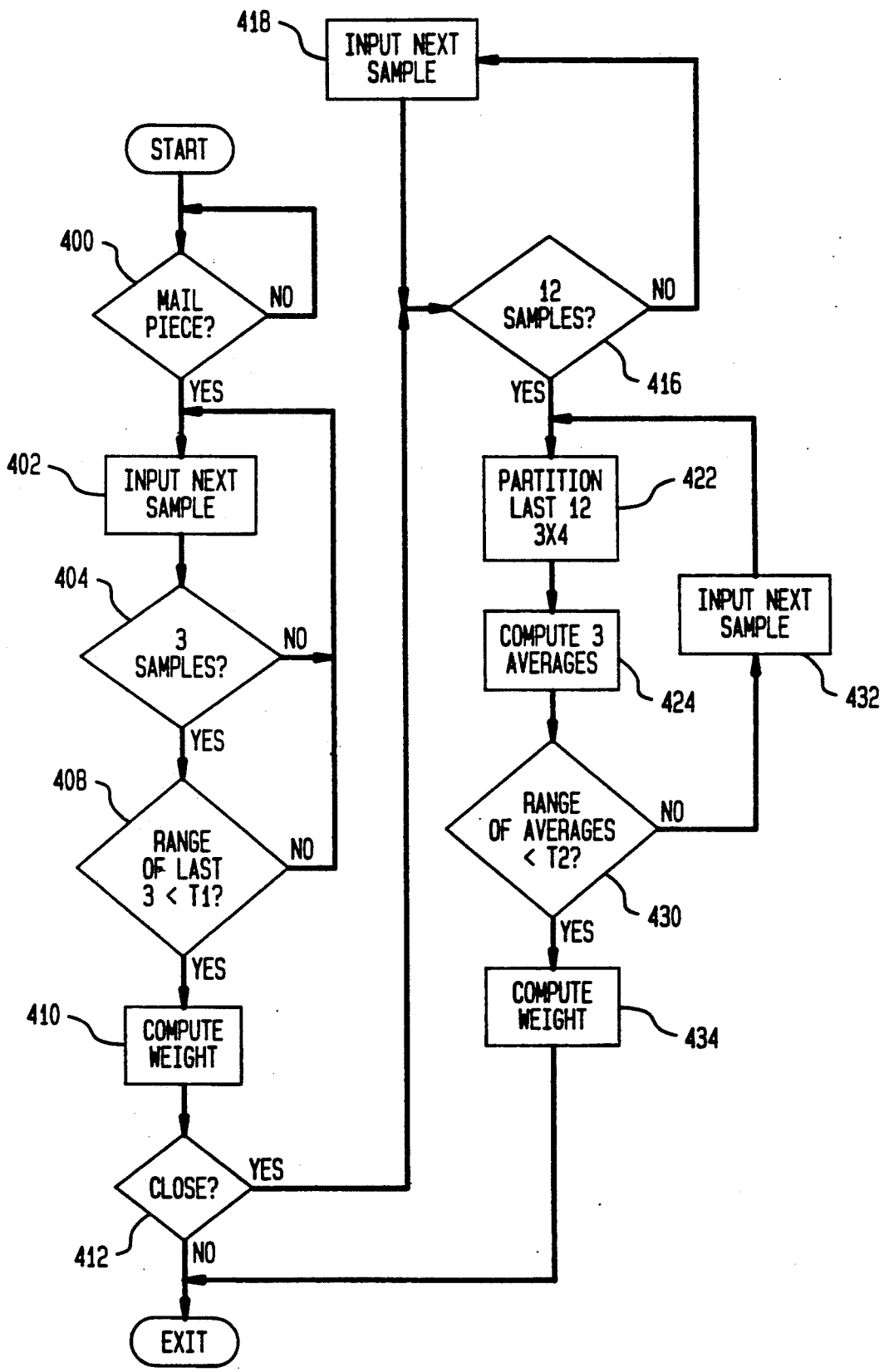
FIG. 17 shows a flow chart representation of the operation of the scale system of the subject invention in determining a weight for a mail piece.

FIG. 17 shows a flow chart of the operation of micro processor 378 in determining the weight of the applied mail piece in response to the series of signals d received from low pass filter 376.

At 400 microprocessor 378 waits for a signal from the system that a mail piece has been placed upon pan 318. Alternatively, as is known in the art, microprocessor 378 may detect the rising edge of the transient response when a mail piece is applied. When a mail piece is applied, at 402 microprocessor 378 inputs the next sample (i.e., signal d), and at 404 tests to determine if it has accumulated three samples. If not it returns to 402 until three samples are accumulated.

When a sequence of three samples is accumulated microprocessor 378 determines the range (i.e., the difference between the maximum and minimum sample of the sequence) and tests if that range is less than a predetermined threshold T1. In a preferred embodiment threshold T1 is approximately 3/32 ounces. If the range of the samples is not within threshold T1 microprocessor 378 loops back through 402 to input thee next sample and continues to loop through 408 until the last three samples tested do have a range less than threshold T1. Thus, all sequences of length three are tested until a first whose range is less than threshold T1 is found.

Then at 410 microprocessor 378 computes an estimate for the weight of the mail piece, as will be described further below. At 412 microprocessor 378 tests to determine if the first estimate computed at 410 is within a predetermined distance of a breakpoint in a postal rate chart such as that shown in FIG. 1. If the first estimate is not within the predetermined distance then the first estimate is used to compute the postage value in a conventional manner well known to those skilled in the art.

Assuming that the first estimate is within the predetermined distance of a breakpoint, then at 416 microprocessor 378 tests to determine if 12 samples are available. If not, it loops through 418 until four samples are available, and then at 422 partitions the 12 samples into 3 consecutive groups of 4 samples, and at 429 computes an average for each of the 3 groups. Then, at 430 microprocessor 378 tests to determine if the range of the averages is less then a second threshold T2. If not, at 432 the next sample is input and microprocessor 378 again loops through 422.

Once a sequence of three averages having a range less then threshold T2 is found, then at 430 microprocessor 78 computes the second estimate for the weight and uses the second estimate to determine the postage amount for the mail piece.

In the above mentioned U.S. Pat. No. 4,787,048, a postal scale where first and second estimates are computed for the weight of a mail piece, and the second estimate is used when the first estimate is sufficiently close to a break point, is disclosed. In the preferred embodiment disclosed in this patent, the first estimate is based on two consecutive samples having a range less then a first threshold, and the second estimate was based on three consecutive samples having a range less than a second, smaller threshold. Since the development of the postal scale of the '048 application, Applicants have realized that a substantial improvement in the average time to determine the weight of a mail piece can be achieved by an improved method of calculating the first estimate. In accordance with applicants invention the first estimate is determined as a function of three or more, and preferably three, samples whose range is less than threshold T1. The first estimate is then computed as the average of all samples, except for the earliest sample. This computation allows use of a relatively wide threshold T1 so that the first estimate is determined quickly yet provides sufficient accuracy so that the first estimate may be used near to a breakpoint, so that a larger portion of weights can be determined using the first estimate.

Examination of FIG. 15 will show that frequently the first sample taken after a mail piece is applied will fall on the raising edge of the transient response. With, in the preferred embodiment described above, threshold T1 equal to 3/32 ounces the first sequence which has a range less than threshold T1 frequently will include the first sample. Accordingly, Applicants have learned that a more accurate estimate is achieved b discarding the possibly anomalous first sample. Using this method of computing the first estimate Applicants have determined that the first estimate may be accepted if it is no closer than approximately 1/16 ounces to a breakpoint.

In one embodiment of the subject invention, the sampling rate is temporarily increased so that the cut-off frequency is approximately doubled when a mail piece is detected, allowing signal d to respond more quickly to the rapidly rising edge shown in FIG. 3. In another embodiment filter 76 may simply be by-passed when a mail piece is detected.

Applicants have also determined that an average time of approximately 250 milliseconds for determining the weight of a mail piece can be achieved with a second threshold T2 of approximately 1/32 ounces. The second estimate is then imputed as the average of all samples comprised in the sequence of three averages, again excepting the earliest sample, for the reasons described above. The second estimate is found to satisfy the accuracy specifications suitable for a postal scale (i.e. ±1/32 of an ounce)

In a preferred embodiment of the subject invention, wherein: the first estimate is computed as the average of the second and third samples of sequence of three samples whose range is less than approximately 3/32 ounces, the second estimate is computed as the average of all samples except for the earliest, of a sequence of three groups of four samples whose averages have a range less than approximately 1/32 ounces, the samples are taken at approximately 20 millisecond intervals, and are processed by a digital filter having a cut off frequency of 5Hz., the pan assembly and load cell structure has no resonances below approximately 5hz., and the mail piece is applied to the scale pan in a controlled and repeatable manner; an average time to determine the weight of representative series of mail pieces has been observed to be approximately 260 milliseconds. (Note that in this observation data samples were recorded and processed off-line to facilitate evaluation of the results).

It should now be well appreciated that the invention as afore described in its preferred embodiment allow the overlap of function which results in substantial time saving. Further, by performing all functions at one location, substantial additional time savings are realized.

What is claimed is:

1. A mailing machine having a plurality of modules, each of said modules to form a single process station having a single registration area for receiving an envelope, wherein said modules include:
   a) a scale module including support means for supporting said envelope, said support means forming a part of said registration area, for weighing said envelope on said support means;
   b) a transport module for positioning said envelope in said registration area of said process station and for ejecting said envelope from said process station;
   c) a meter module including printing means for imprinting an indicia representative of a postage amount on said envelope while said envelope is in said registration area; and
   d) a platen module having means for causing said envelope to contact said printing means while said envelope is in said registration area; wherein
   e) said modules each operate in a manner generally functionally independent of any other module and does not interfere with the operation of any other module, and said modules perform their respective function with respect to said envelope while said envelope is at said process station; and wherein further,
   f) said scale module further comprises:
      f1) transducer means for generating a series of signals representative of the instantaneous response of said support means; and,
      f2) processing means responsive to said transducer signals for:
         f2.1) detecting the presence of said envelope on said support means;

f2.2) examining all subsequent sequences of said transducer signals having a first length to determine the difference between the maximum and minimum values for each of said first length sequences; and f2.3) for the first of said first length sequences of which said difference is less than a predetermined threshold, determining a first estimate for said weight as the average of said values, except for the first value, comprising said first length sequence; then f2.4) if said first estimate is not within a predetermined distance of a breakpoint of a selected postal rate chart using said first estimate to determine said postage amount in accordance with said postal rate chart; and f2.5) if said first estimate is within said predetermined distance, examining additional sequences of said transducer signals to make a second, more accurate estimate, and using said second estimate to determine said postage amount in accordance with said postal rate chart.

2. A mailing machine as described in claim 1 wherein said processing means is further for determining weights of a representative sequence of mail pieces, the average time for said determining of weights of said representative sequence being approximately equal to a predetermined time; and wherein said support means and said transducer means are connected to form a structure having a stiffness sufficiently great in relation to its mass that said structure has no resonances below a predetermined frequency, the period of said predetermined frequency being substantially less than said predetermined time.

3. A mailing machine as described in claim 2 wherein said transducer means further comprises a low pass digital filter for processing said transducer signals prior to output, said filter having a cut-off frequence approximately equal to said predetermined frequency.

4. A mailing machine as described in claim 3 wherein the rate of said series of transducer signals is temporarily increased during a period approximately coincident with the initial response of said support means when said mail piece is applied by a factor such that said cut-off frequency is approximately doubled.

5. A mailing machine as described in claim 3 wherein said digital filter is by-passed during a period approximately coincident with the initial response of said support means when said mail piece is applied.

6. A mailing machine described in claims 1 or 2 wherein said weight range is 1 ounce, said predetermined distance to said break points is 1/16th of an ounce, and said first threshold is 3/32's of an ounce.

7. A mailing machine as described in claims 1 or 2 further comprising means for applying said mail piece to said support means in a controlled and repeatable manner.

8. A mailing machine as described in claims 1 or 2 wherein said determination of said second estimate further comprises.

a) averaging a series of adjacent, non-intersecting sequences of said transducer signals, said adjacent signals having a second length;

b) examining all sequences of said averages having a third length to determine the difference between the maximum and minimum averages for each of said sequences;

c) for the first of said sequences of averages for which said difference is less than a second threshold determining a second estimate of said weight as a function of the values of all of said transducer signals comprised in said first sequence of averages; and, d) using said second estimate to determine said postage amount.

9. A mailing machine as described in claim 8 wherein said values comprised in said first sequence of averages include values comprised in said first length sequence.

10. A mailing machine as described in claim 9 wherein said second estimate is determined as the average of all of said values comprised in said first sequence of averages, except for the first value.

11. A mailing machine as described in claim 8 wherein said second length is 4 of said transducer signals, said third length is 3 of said averages and said second threshold is 1/32 of an ounce.

12. A mailing machine having a plurality of modules, each of said modules to form a single process station having a single registration area for receiving an envelope, wherein said modules include:

a) a scale module including support means for supporting said envelope, said support means forming a part of said registration area, for weighing aid envelope on said support means;

b) a transport module for positioning said envelope in said registration area of said process station and for ejecting said envelope from said process station;

c) a meter module including printing means for imprinting an indicia on said envelope while said envelope is in said registration area; and d) a platen module having means for causing said envelope to contract said printing means while said envelope is in said registration area; wherein e) said modules each operate in a manner generally functionally independent of any other module and does not interfere with the operation of any other module, and said modules perform their respective functions with respect to said envelope while said envelope is at said process station; and wherein further, f) said scale module further comprises:

f1) transducer means for generating an output representative of the instantaneous response of said support means, said support means and said transducer being connected to form a structure; and f2) means for receiving said output of said transducer means and for determining the weight of said item as a function of said output; wherein, f3) the average time for determining the weight of a representative series of said items is approximately equal to a predetermined time; and wherein, f4) the stiffness of said structure is sufficiently great in relation to its mass that said a structure has no resonances below predetermined frequency, the period of said frequency being substantially less than said predetermined time.

13. A mailing machine as described in claim 32 wherein said transducer means further comprises a load cell.

14. A mailing machine as described in claim 13 further comprising means for applying said item to said support means in a controlled and repeatable manner.

15. A mailing machine as described in claim 13 further comprising means for applying said item to said support means in a controlled and repeatable manner.

16. A mailing machine as described in claim 15 wherein the output of said transducer means is processed by a low pass digital filter, the cut off frequency of said filter being approximately equal to said predetermined frequency.

17. A mailing machine as described in claim 16 wherein the rate at which said digital filter samples said output is temporarily increased for a period approximately coincident the initial response of said support means to the application of said load by a factor such that the cut off frequency is approximately doubled.

18. A mailing machine as described in claim 12 wherein the output of said transducer means is processed by a low pass digital filter, the cut off frequency of said filter being approximately equal to said predetermined frequency.

19. A mailing machine as described in claim 18 wherein the rate at which said digital filter samples said output is temporarily increased for a period approximately coincident the initial response of said support means to the application of said load by a factor such that the cut off frequency is approximately doubled.

20. A mailing machine as described in claim 18 wherein said digital filter is temporarily by-passed for a period of approximately coincident with the initial response of said support means to the application of said load.

* * * * *